US011751705B2

(12) United States Patent
Josette

(10) Patent No.: US 11,751,705 B2
(45) Date of Patent: Sep. 12, 2023

(54) PILLOW

(71) Applicant: Alizah Josette, Warwick, RI (US)

(72) Inventor: Alizah Josette, Warwick, RI (US)

( * ) Notice: Subject to any disclaimer, the term of this patent is extended or adjusted under 35 U.S.C. 154(b) by 128 days.

(21) Appl. No.: 17/382,095

(22) Filed: Jul. 21, 2021

(65) Prior Publication Data

US 2022/0022671 A1    Jan. 27, 2022

Related U.S. Application Data

(60) Provisional application No. 63/054,902, filed on Jul. 22, 2020.

(51) Int. Cl.
*A47G 9/10* (2006.01)
(52) U.S. Cl.
CPC .................... *A47G 9/1081* (2013.01)
(58) Field of Classification Search
CPC ...... A47G 9/10; A47G 9/1027; A47G 9/1072; A47G 9/1081; A47G 2009/1018
See application file for complete search history.

(56) References Cited

U.S. PATENT DOCUMENTS

| 8,065 A * | 4/1851 | Goshon et al. ..... G06F 3/03543 248/118.5 |
| 378,952 A * | 3/1888 | Buntrock et al. ........ A47G 9/10 5/491 |
| 1,491,146 A * | 4/1924 | Larson ..................... A47G 9/10 5/636 |
| RE17,607 E * | 2/1930 | Lange ...................... A47G 9/10 5/645 |
| 5,933,890 A * | 8/1999 | Codd ................... A47G 9/1009 5/636 |
| 6,412,127 B1 * | 7/2002 | Cuddy ................. A47C 20/026 5/640 |
| 6,651,256 B1 * | 11/2003 | Swift ....................... A47G 9/10 2/202 |
| 7,428,763 B2 * | 9/2008 | Hightower ............... A47G 9/10 5/639 |
| 8,584,285 B1 * | 11/2013 | Sipherd .................. A47C 7/383 5/636 |
| 9,434,283 B2 * | 9/2016 | Spalter .................... A47C 7/383 |
| 9,526,360 B2 * | 12/2016 | Sternlight ................ A47G 9/10 |
| 10,945,545 B2 * | 3/2021 | Anderson ............ A47G 9/1045 |

(Continued)

OTHER PUBLICATIONS

"Memory Foam Wedge Contour Orthopedic Knee Pillow Sciatica Nerve Relief Leg Support," Jollychic.com, https://www.jollychic.com/p/memory-foam-wedge-contour-orthopedic-knee-pillow-sciatica-nerve-relief-leg-support-g0xdx0x-dx-a-eqa6cs-i-aoo-73.html [Date accessed: Mar. 22, 2020].

*Primary Examiner* — David R Hare
*Assistant Examiner* — George Sun
(74) *Attorney, Agent, or Firm* — Bold IP, PLLC; Houda El-Jarrah

(57) ABSTRACT

Disclosed herein is one or more embodiments of a pillow including a body including a base and side supports. The body includes a compressible material. The base includes a convexly curved bottom surface. The side supports extend vertically from the base. The base and side supports define an indent with a shape sized and arranged for a human head to fit in the indent. The side supports are arranged and sized to provide side support to the human head when the human head is resting in the indent. The indent extends from a first side of the base.

17 Claims, 4 Drawing Sheets

(56) References Cited

U.S. PATENT DOCUMENTS

| | | | |
|---|---|---|---|
| 2004/0107501 A1* | 6/2004 | Kancilja | A47G 9/10 |
| | | | 5/636 |
| 2013/0113262 A1* | 5/2013 | Nam | A47G 9/1081 |
| | | | 297/391 |
| 2014/0075677 A1* | 3/2014 | Raghuprasad | A47G 9/1027 |
| | | | 5/636 |
| 2017/0095096 A1* | 4/2017 | Mandell | A47C 15/00 |
| 2019/0059621 A1* | 2/2019 | Chaibainou | A47G 9/1081 |
| 2020/0221880 A1* | 7/2020 | Rogers | A47G 9/10 |
| 2020/0237123 A1* | 7/2020 | Yu | A61F 5/3707 |
| 2021/0212483 A1* | 7/2021 | Vo | A47G 9/1081 |

\* cited by examiner

PILLOW

CROSS REFERENCE TO RELATED APPLICATIONS

This application claims priority to provisional application No. 63/054,902, which was filed 22 Jul. 2020, which is incorporated in its entirety.

FIELD OF THE DISCLOSURE

The present invention relates to pillows and other devices for supporting a human head.

BACKGROUND

Pillows of various designs have existed for millennia. Most pillows include very little lateral support for the head. This lack of side support for the head can cause discomfort for those who need to sleep on their back. For example, pregnant women, people with certain medical conditions or using certain medical devices while sleeping, and women with breast implants need to sleep on their back.

Some pillows have been made with substantial lateral support. However, these pillows generally have a problem of pushing on or pinching the side of the face. This can cause the person using the pillow to feel uncomfortable either from restriction of movement or from heat. For many of these pillows with substantial side support, the pinching is caused by a compression of the materials below the head pulling the sides of the pillow inward.

SUMMARY

One or more embodiments are provided below for a pillow. The pillow may include a body including a base and side supports. The body may include a compressible material. The base may include a convexly curved bottom surface. The side supports may extend vertically from the base. The base and side supports may define an indent with a shape sized and arranged for a human head to fit in the indent. The side supports may be arranged and sized to provide side support to the human head when the human head is resting in the indent. The indent may extend from a first side of the base.

The pillow may provide significant advantages over the devices known in the art. The device may have a curved bottom surface that causes the amount of material under the side supports to be decreased and the effect of the compression from the head on the material of the pillow causing the sides to push on the side of the head to be significantly lessened while still providing lateral support for the head.

Other advantageous features as well as other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
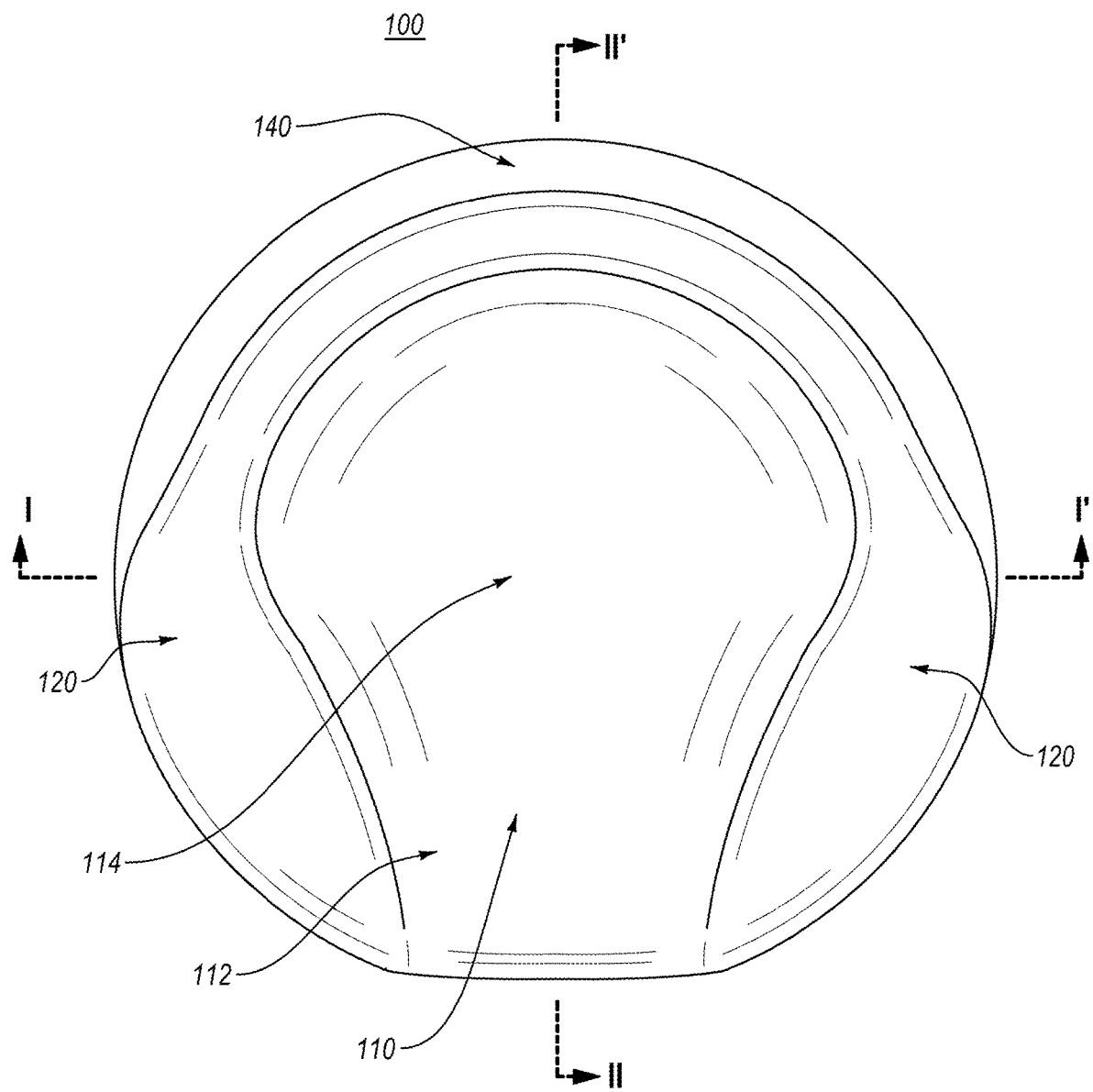
FIG. 1 shows an example top view of a pillow.

In the Summary above and in this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

Referring now to the drawings and the following written description of the present invention, it will be readily understood by those persons skilled in the art that the present invention is susceptible to broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

Figure 2:
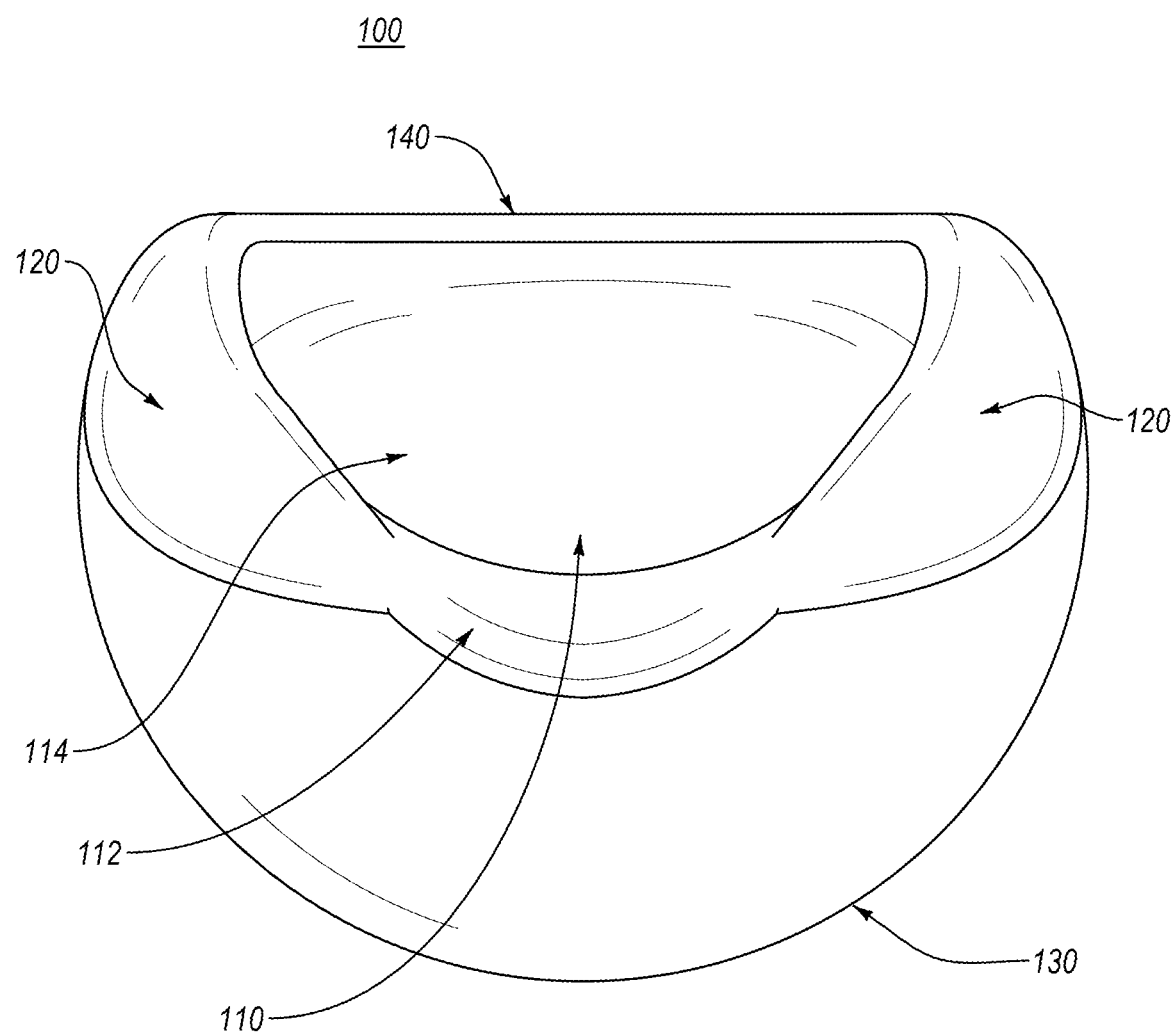
FIG. 2 shows an example front-top view of the pillow.

FIG. 1 shows an example top view of a pillow 100. FIG. 2 shows an example front-top view of the pillow 100. The pillow 100 may be made of one or more layers of memory foam or other compressible material suitable for supporting a human head. The pillow 100 may have a generally spherical or ball shape with an indent 110 removed from the generally spherical or ball shape. The pillow may include the indent 110, side supports 120, and crown support 140. The indent 110 may include a head portion 114 and a neck portion 112. The head portion 114 of the indent 110 may be shaped to be complementary to the back of a human head. For example, the head portion 114 of the indent 110 may be about 7-9 inches wide at its widest point. The neck portion 112 of the indent 110 may be shaped to be complementary to the back of a human neck. The neck portion 112 may be narrower than the widest portion of the head portion 114. For example, the neck portion may be about 6-7 inches wide. The size of the indent 110 may be modified for heads and necks of different sizes.

The side supports 120 may be portions of the pillow 100 arranged to provide lateral support to sides of a head resting in the indent 110. The side supports 120 may define a portion of the indent 110 such that the indent 110 is complementary to the back of a human head. The crown support 140 may be a portion of the pillow 100 arranged to provide support to the crown of a head resting in the indent 110. The crown support 140 may define a portion of the indent 110 such that the indent 110 is complementary to the back of a human head.

Figure 3:
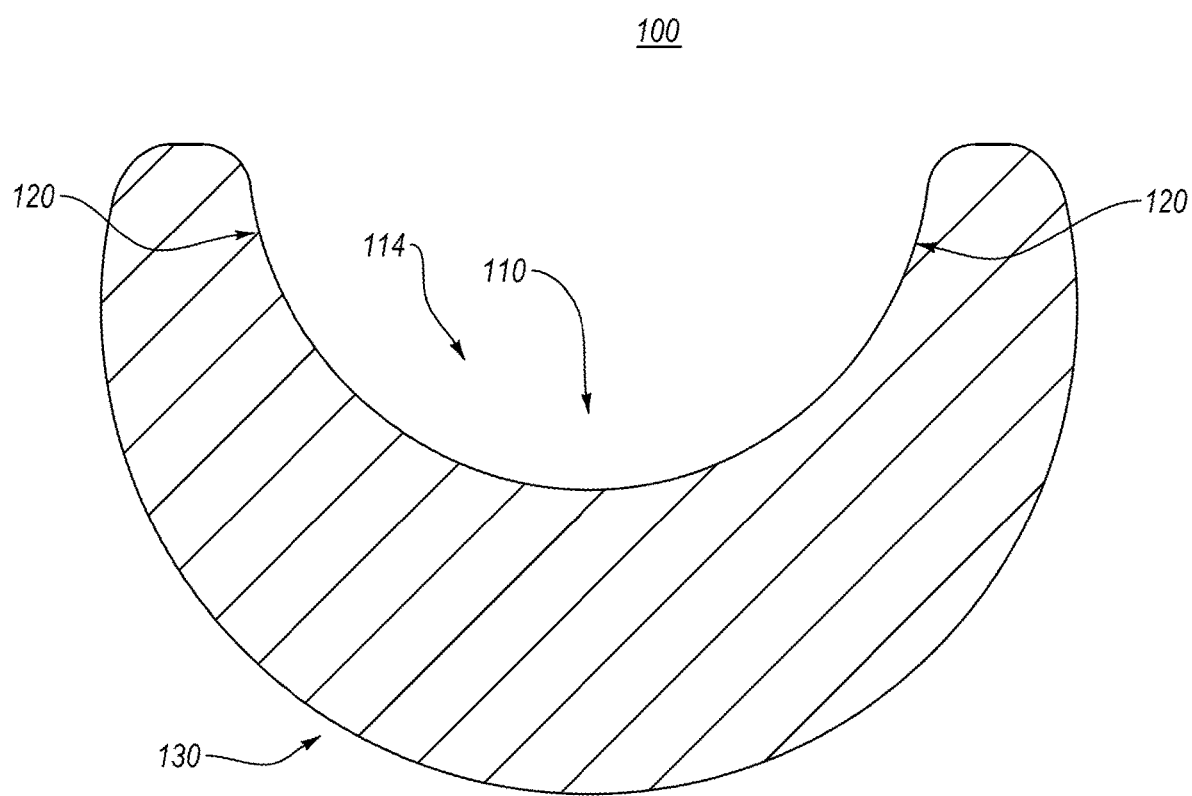
FIG. 3 shows an example cross sectional view of the pillow along the line I-I'.

FIG. 3 shows an example cross sectional view of a pillow 100 along the line I-I' illustrated in FIG. 1. The pillow 100 may include side supports 120, bottom surface 130, and indent 110. The indent 110 at the cross section along the line I-I' is part of the head portion 114. The head portion 114 of the indent 210 may have a rounded shape to complement the shape of the back of a human head. The side supports 120 may include a portion that is curved and a portion that is vertical such that the side supports 120 define the head portion 114 of the indent 110 that is complementary to the shape of the back of a human head. The bottom surface 130 of the pillow 100 may have a convexly curved shape. For example, the bottom surface 130 may be the arch of a circle. In some embodiments, the bottom surface 130 may be an arch of an ellipse or other similar convex curve. The indent 110 may be above and aligned with the bottom surface 230.

When the weight of a human head is placed on the pillow 100 the material of the pillow 100 will compress. As the material in the center compresses, it pulls the materials to the sides down and toward the center and causes the pillow to pinch on the sides of the face. Advantageously, the shape of the bottom surface 130 of the pillow 100 causes this effect to be reduced. It is believed that this advantage is caused by the bottom portion of the pillow 100 not having as much lateral material to pull on. Accordingly, the shape of the pillow 100, especially the shape of the bottom surface 130 of the pillow causes the pillow 100 to have a reduced pinching effect on the sides of the face while providing lateral support.

Figure 4:
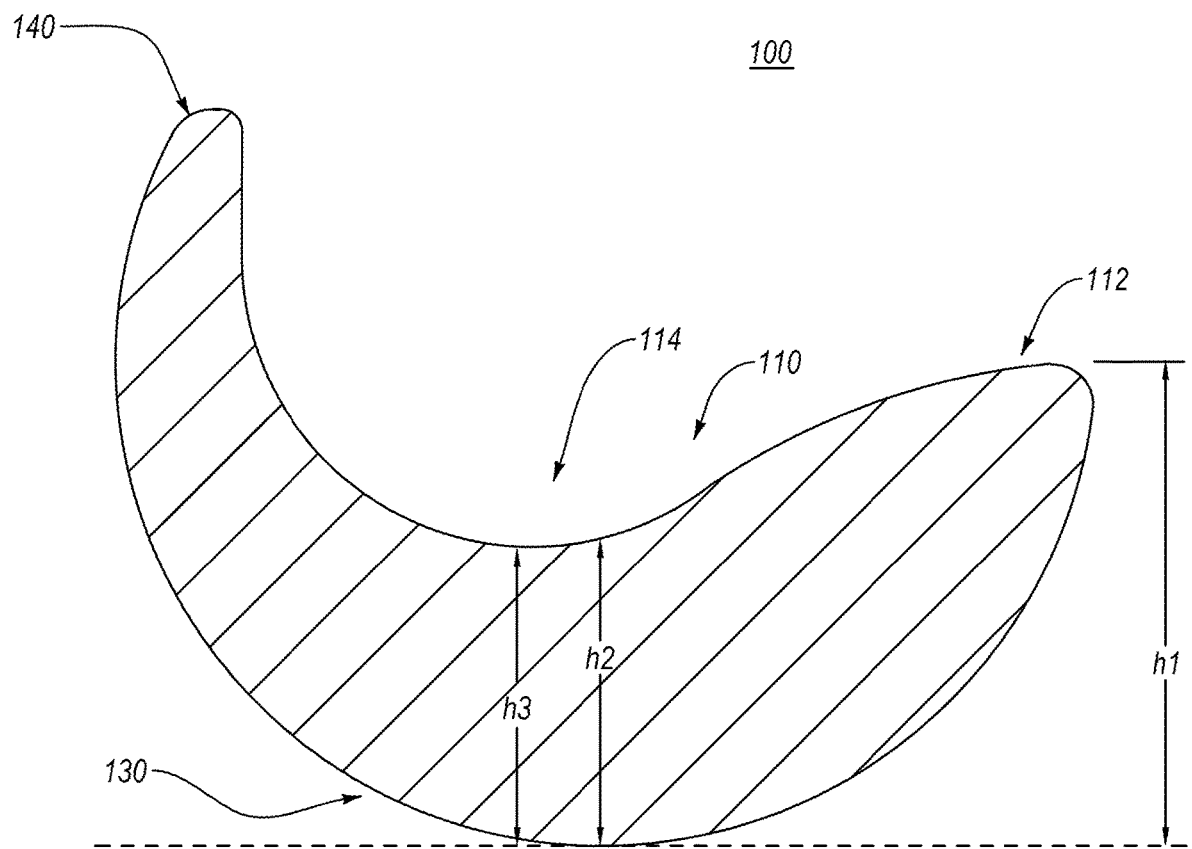
FIG. 4 shows an example cross sectional view of the pillow along the line II-II'.

FIG. 4 shows an example cross sectional view of a pillow 100 along the line II-IF illustrated in FIG. 1. The pillow 100 may include a crown support 140, bottom surface 130, and indent 110. The indent 110 may include head portion 114 and neck portion 112.

The pillow 100 at the bottom of the neck portion 112 of the indent 110 may have a height h1 greater than a height h3 of the lowest portion of the head portion 114 of the indent 110. A height h2 of the pillow 100 at the head portion 114 of the indent 110 at a center (from left to right in FIG. 3 and FIG. 4) of the pillow 100 may be greater than the height h3. The height h3 being less than the height h2 is advantageous for comfort. If the indent 110 had its deepest portion to the right (from the perspective of FIG. 4) of or at the lowest portion of the curved surface 130 and the bottom surface 130 is convex, the pillow 100 would have a tendency to tilt the head and neck resting in the pillow. This could cause discomfort and might require a user to constantly adjust the pillow 100. Accordingly, a center of the pillow may be between a deepest portion of the indent 110 and the neck portion 112 of the indent 110.

The crown support 140 may include a portion that is curved and a portion that is vertical such that the crown support 140 defines the head portion 114 of the indent 110 that is complementary to the shape of the back of a human head. The bottom surface 130 of the pillow 100 may have a convexly curved shape. For example, the bottom surface 130 may be the arch of a circle. The indent 110 may be above and aligned with the bottom surface 130. In some embodiments, the bottom surface 130 may be an arch of an ellipse or other similar convex curve.

The general shape of the pillow 100 may be a sphere with a radius of about 12 inches with the indent 110 removed from the sphere. The height h1 may be about 8 inches (without a human head pressing on the pillow). The height h2 may be about 7 inches. The height h3 may be about 6.8 inches. The size and shape of the pillow 100 and the heights h1, h2, and h3 may be modified for different sized heads. The indent 110 may be entirely in the top half of the pillow 100. The material of the pillow 100 may be chosen such that under the pressure of a human head the pillow 100 compresses to a comfortable height for the user.

Generally speaking, the pillow 100 may include/comprise a body. The body may include a compressible material and include areas of the pillow formed by the compressible material. The body may include a base (areas of the body which are below the indent 110 and/or not part of the side supports 120 and crown support 114. The base may include and define a convexly curved bottom surface 130. The side supports may extend vertically from the base. The base and side supports may define the indent 110. The indent 110 may have a shape sized and arranged for a human head to fit in the indent 110. The side supports 120 may be arranged and sized to provide side support to the human head when the human head is resting in the indent 110. The indent 110 may extend from a first side of the base. The first side may be the side of the base from which the neck portion 112 of the indent extends. Or restated, the neck portion 112 may go to the first side of the base when viewed from a top view.

The body of the pillow 100 may have a generally spherical shape with the indent 110 removed from the generally spherical shape. The body may further include a crown support 140 extending vertically from the base and configured to provide support to a crown of the human head when the human head is resting in the indent 110. Vertically may mean only in an upward direction or a combination of upward and lateral. The indent 110 may be above and aligned with the convexly curved bottom surface 130. The convexly curved bottom surface 130 may have a lowest point of the convexly curved bottom surface at about a center of the base. The center of the base being a position equidistant from the first side and a side opposite the first side of the pillow 100 when viewed from the top view. The center may also be a position equally distant from all other sides of the pillow 100 when viewed from the top view if the pillow 100 has a generally spherical shape.

The indent 110 may have a lowest point of the indent where the lowest point of the convexly curved bottom surface 130 is between the lowest point of the indent 110 and the first side of the base in a first direction (direction toward the first side). The convexly curved bottom surface 130 of the base may be curved such that the side supports 120 extend vertically from the base above a portion of the base that does not extend downward to the lowest point of the convexly curved bottom surface 130. The convexly curved bottom surface of the base may also be curved such that the crown support 140 extends vertically from the base above a portion of the base that does not extend downward to the lowest point of the convexly curved bottom surface 130. The lowest point of the convexly curved bottom surface may be the location with the height h2. The indent 110 may include a head portion 114 arranged and sized for the human head to fit in the head portion 114 and a neck portion 112 arranged and sized for a human neck to fit in the neck portion 112. The neck portion may extend to the first side of the base. The side supports 120 may extend along sides of the head portion 114 of the indent 110 and along sides of the neck portion 112 of the indent 110. The indent 110 may not extend as high vertically at the sides of the neck portion 112 as the side supports 120 extend vertically at the sides of the head portion 114 of the indent as shown in FIG. 2. As discussed above, the lower side supports 120 at the sides of the neck portion 112 allow for various shapes of neck to be accommodated and people with sensitive necks as well without compromising the support of the pillow 100.

The indent at the neck portion 112 may not be as deep as the indent at the center of the base (the location with height h2). The indent 110 at the neck portion 112 may not be as wide as the indent 110 at the center of the base.

In other terms, the pillow 100 may include a body that is made of or includes a compressible material. The body may include a base and side supports 120. The base may include a convexly curved bottom surface. The side supports 120 may extend vertically from the base. The base and side supports may partially or completely define an indent. Defining an indent 110 may include completely or partially defining the indent 110. The indent 110 may extend from the first side of the base. The convexly curved bottom surface 130 of the base may be curved such that the side supports 120 extend vertically from the base above a portion of the base that does not extend downward to the lowest point of the convexly curved bottom surface 130. The convexly curved bottom surface 130 of the base is curved such that the crown support 140 extends vertically from the base above a portion of the base that does not extend downward to the lowest point of the convexly curved bottom surface 130.

Many different embodiments of the inventive concepts have been shown. A person of ordinary skill in the art will appreciate that the features from different embodiments may be combined or replaced with other features from different embodiments.

The pillow 100 may provide significant advantages over the devices known in the art. The pillow 100 may have a curved bottom surface 130 that causes the amount of material under the side supports 120 to be decreased and the effect of the compression from the head on the material of the pillow 100 causing the sides to push on the side of the head to be significantly lessened while still providing lateral support for the head. This reduces discomfort and allows softer materials to be used to form the body of the pillow 100. A stiff material may compress less and press less on the sides of the head but may also be much less comfortable on the back of the head. Further, the shaping of the indent 110 to complement the shape of the back of the human head adds in comfort. Further, the placement of the lowest portion of the indent 110 behind the center of the pillow from the first end where the neck rests in the neck portion 112 causes the pillow to be more stable and reduces the chance of the pillow tilting forward when a human head is rested in the indent 110. Further, because side support is less important on the sides of the neck (compared to the sides of the head), the side supports being lower on the neck portion 112 provides an advantage in comfort for some people (people with wide or sensitive necks) without compromising the support of the pillow 100.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A pillow comprising:
   a body including a compressible material, wherein the body includes:
   a base including a convexly curved bottom surface; and
   a first side support extending vertically from the base; and
   a second side support extending vertically from the base, wherein the second side support is opposite to the first side support along a same axis, wherein the base and first side support and second side support define an indent with a shape sized and arranged for a human head to fit in the indent, and the first side support and the second side support are arranged and sized to provide side support to the human head when the human head is resting in the indent, wherein the indent extends from a first side of the base;
   wherein the convexly curved bottom surface has a lowest point of the convexly curved bottom surface at about a center of the base;
   wherein the indent has a lowest point of the indent, and the lowest point of the convexly curved bottom surface is between the lowest point of the indent and the first side of the base in a first direction;

wherein the convexly curved bottom surface of the base is curved such that the first side support and the second side support extend vertically from the base above a portion of the base that does not extend downward to the lowest point of the convexly curved bottom surface.

2. The pillow of claim 1, wherein the body of the pillow has a generally spherical shape with the indent removed from the generally spherical shape.

3. The pillow of claim 1, wherein the body further includes a crown support extending vertically from the base and configured to provide support to a crown of the human head when the human head is resting in the indent.

4. The pillow of claim 1, wherein the indent is above and aligned with the convexly curved bottom surface.

5. The pillow of claim 1, wherein the convexly curved bottom surface of the base is curved such that the crown support extends vertically from the base above a portion of the base that does not extend downward to the lowest point of the convexly curved bottom surface.

6. The pillow of claim 1, wherein the indent includes a head portion arranged and sized for the human head to fit in the head portion and a neck portion arranged and sized for a human neck to fit in the neck portion, wherein the neck portion extends to the first side of the base.

7. The pillow of claim 6, wherein the first side support and the second side support extend along sides of the head portion of the indent and along sides of the neck portion of the indent, wherein the indent does not extend as high vertically at the sides of the neck portion as the first side support and the second side support side supports extend vertically at the sides of the head portion of the indent.

8. The pillow of claim 7, wherein the indent at the neck portion is not as deep as the indent at the center of the base.

9. The pillow of claim 8, wherein the indent at the neck portion is not as wide as the indent at the center of the base.

10. A pillow comprising:
a body including a compressible material, wherein the body includes:
a base including a convexly curved bottom surface; and
a first side support extending vertically from the base; and
a second side support extending vertically from the base, wherein the second side support is opposite to the first side support along a same axis;
wherein the base and first side support and second side support define an indent, wherein the indent extends from a first side of the base, wherein the convexly curved bottom surface of the base is curved such that the first side support and the second side support extend vertically from the base above a portion of the base that does not extend downward to the lowest point of the convexly curved bottom surface, and wherein the convexly curved bottom surface of the base is curved such that a crown support extends vertically from the base above a portion of the base that does not extend downward to the lowest point of the convexly curved bottom surface.

11. The pillow of claim 10, wherein the body of the pillow has a generally spherical shape with the indent removed from the generally spherical shape.

12. The pillow of claim 10, wherein the body further includes the crown support extending vertically from the base on a side of the base opposite the first side.

13. The pillow of claim 10, wherein the indent is above and aligned with the convexly curved bottom surface.

14. The pillow of claim 10, wherein the convexly curved bottom surface has a lowest point of the convexly curved bottom surface at about a center of the base.

15. The pillow of claim 14, wherein the indent has a lowest point of the indent, and the lowest point of the convexly curved bottom surface is between the lowest point of the indent and the first side of the base in a first direction.

16. The pillow of claim 10, wherein the indent includes a head portion arranged and sized for a human head to fit in the head portion and a neck portion arranged and sized for a human neck to fit in the neck portion, wherein the neck portion extends to the first side of the base.

17. The pillow of claim 16, wherein the first side support and the second side support extend along sides of the head portion of the indent and along sides of the neck portion of the indent, wherein the indent does not extend as high vertically at the sides of the neck portion as the side supports extend vertically at the sides of the head portion of the indent.

* * * * *